United States Patent
Wang

(10) Patent No.: US 9,690,733 B2
(45) Date of Patent: Jun. 27, 2017

(54) INFORMATION PROCESSING APPARATUS AND CONTROL METHOD OF INFORMATION PROCESSING APPARATUS

(71) Applicant: CANON KABUSHIKI KAISHA, Tokyo (JP)

(72) Inventor: Xiaoli Wang, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 131 days.

(21) Appl. No.: 14/576,946

(22) Filed: Dec. 19, 2014

(65) Prior Publication Data
US 2015/0186302 A1  Jul. 2, 2015

(30) Foreign Application Priority Data

Dec. 27, 2013 (JP) .................. 2013-271408

(51) Int. Cl.
*G06F 3/00* (2006.01)
*G06F 13/38* (2006.01)

(52) U.S. Cl.
CPC .................. *G06F 13/387* (2013.01)

(58) Field of Classification Search
None
See application file for complete search history.

(56) References Cited

U.S. PATENT DOCUMENTS

| 7,650,585 B1* | 1/2010 | Miller | G06F 17/5054 |
| | | | 716/138 |
| 2002/0066046 A1* | 5/2002 | Liu | G06F 9/4401 |
| | | | 713/300 |
| 2013/0095888 A1* | 4/2013 | Chapman | H04M 1/0254 |
| | | | 455/557 |
| 2014/0173370 A1* | 6/2014 | Chen | G01R 31/31705 |
| | | | 714/724 |
| 2014/0223158 A1* | 8/2014 | Zhou | G06F 9/4405 |
| | | | 713/2 |
| 2016/0077995 A1* | 3/2016 | Mishra | G06F 1/10 |
| | | | 710/106 |

FOREIGN PATENT DOCUMENTS

| CN | 1623131 A | 6/2005 |
| CN | 101131647 A | 2/2008 |
| JP | 2012043309 A | 3/2012 |

* cited by examiner

*Primary Examiner* — Elias Mamo
(74) *Attorney, Agent, or Firm* — Canon U.S.A., Inc. IP Division

(57) ABSTRACT

An information processing apparatus includes a control unit configured to activate the information processing apparatus in a first activation mode or a second activation mode, a receiving unit configured to receive an operation for activating the information processing apparatus in the first activation mode from a user, a notification unit configured to notify the control unit of information corresponding to the operation of the user received by the receiving unit, and a connection unit configured to connect the control unit and the receiving unit without connecting the notification unit and to notify the control unit that a user has operated on the receiving unit, wherein the control unit activates, in the case where it is not notified via the connection unit that a user has operated on the receiving unit, the information processing apparatus in the second activation mode without waiting for activation of the notification unit.

8 Claims, 6 Drawing Sheets

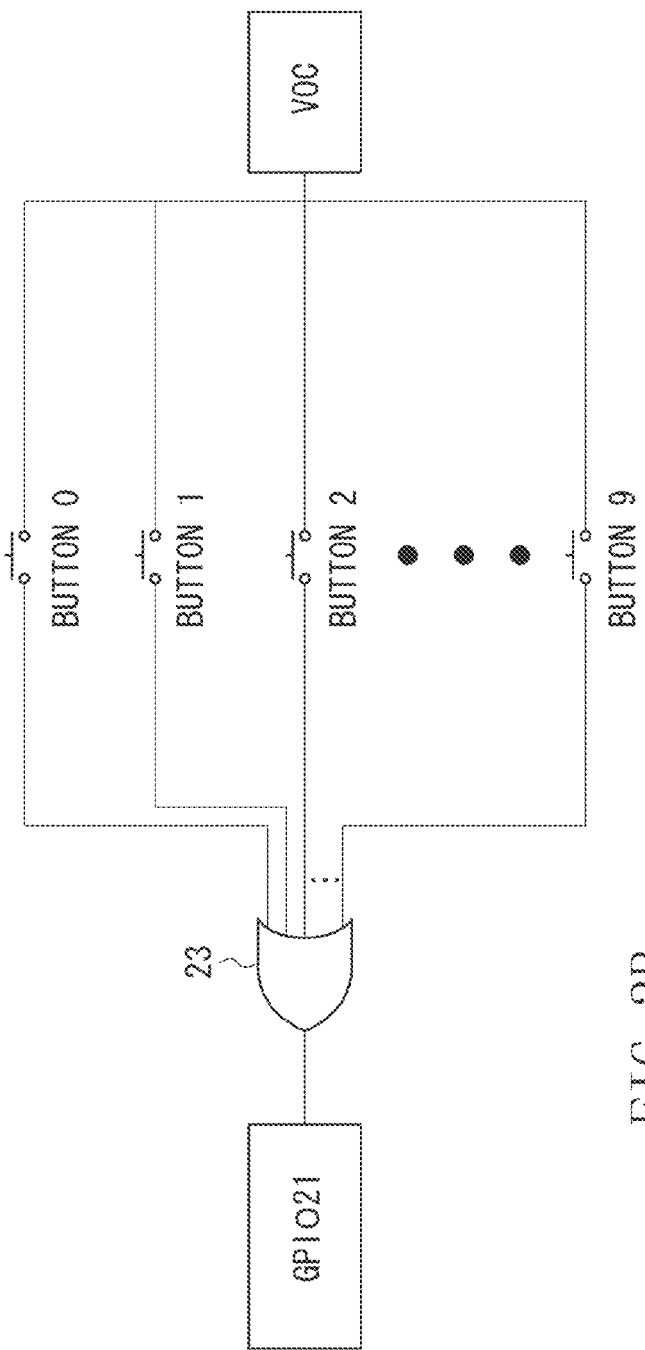
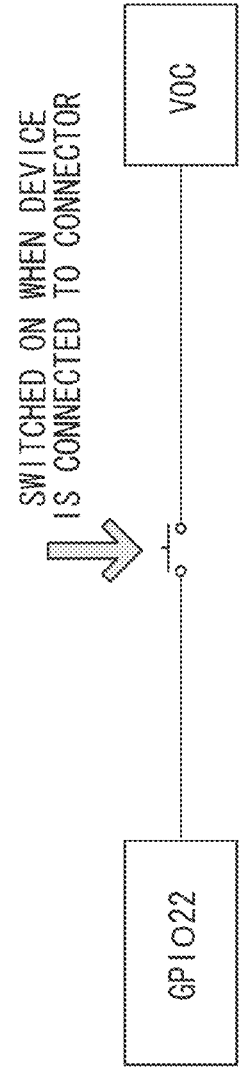
FIG. 2A
FIG. 2B

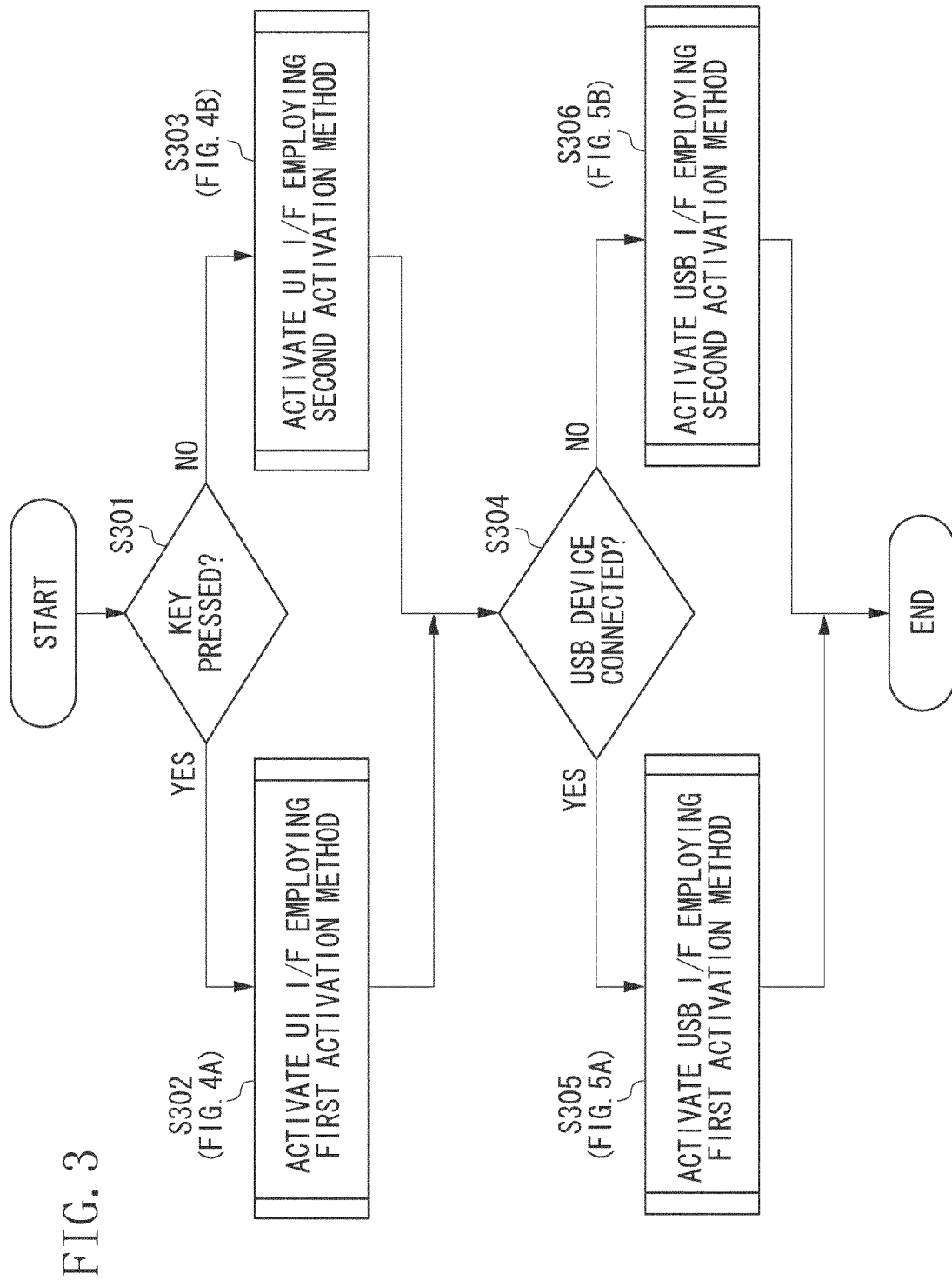

INFORMATION PROCESSING APPARATUS AND CONTROL METHOD OF INFORMATION PROCESSING APPARATUS

BACKGROUND OF THE INVENTION

Field of the Invention

The present invention relates to an information processing apparatus and a control method of the information processing apparatus.

Description of the Related Art

There is an information processing apparatus which has two or more activation modes (i.e., a user mode and a service mode) corresponding to normal use by a user and maintenance thereof. In such a case, if a service person performs a special operation on an operation unit when the information processing apparatus is activated and the information processing apparatus detects such an operation, the information processing apparatus enters the service mode.

Further, an example of the special operation in the case of an information processing apparatus (i.e., a personal computer (PC)) in which Windows® is installed is as follows. If the information processing apparatus is activated while the user is pressing an F8 key corresponding to a function key of a keyboard, i.e., an input device, the information processing apparatus enters a safe mode.

Furthermore, if a device is connected to an external interface when the information processing is activated, an initialization process may change. More specifically, when a system detects an external device when activated, the system initializes the device. If the information processing apparatus cannot detect the connected device, the information processing apparatus continues the activation process without performing initialization.

Japanese Patent Application Laid-Open No. 2012-43309 discusses an example of the case where the device is connected to the information processing apparatus. More specifically, when a camera having a network adaptor is connected to a universal serial bus (USB) connector, the information processing apparatus is controlled to initialize the camera when activated. If the camera is not connected, the information processing apparatus is controlled not to perform initialization.

When the information processing apparatus detects the above-described special operation (i.e., connection of the device), the information processing apparatus initializes an internal interface and performs polling on an external interface (i.e., the operation unit) connected to the internal interface. The information processing apparatus then loads different programs according to a polling result and becomes activated. The external interface is a device which converts an electric signal corresponding to a machine operation by the user or from the external device, and transmits and receives the converted electric signal to and from the internal interface. The operation unit and the USB connector in the information processing apparatus are examples of the external interface.

Further, the internal interface converts the electric signal from the external interface, and transmits and receives the converted electric signal to and from the internal interface. A USB host controller is an example of the internal interface. In such a case, the external interface is the connector for connecting to a USB device.

Furthermore, polling is performed for determining a preparation status of transmission and reception and an operation status of the device by electrically inquiring on such statuses. It is necessary to initialize the internal interface for performing such polling. The information processing apparatus thus initializes the internal interface and performs polling on the external interface each time the apparatus is activated regardless of whether there is an operation (i.e., connection of the device).

Further, when the information processing apparatus is activated in the service mode which is less frequent as compared to activation in the user mode, the apparatus always initializes the internal interface when activated. Extra time thus becomes necessary so that activation is delayed.

SUMMARY OF THE INVENTION

The present invention is directed to providing a method for detecting the status of an external interface connected to an internal interface and for adjusting timing of initializing the internal interface.

According to an aspect of the present invention, an information processing apparatus includes a control unit configured to activate the information processing apparatus in a first activation mode or a second activation mode, a receiving unit configured to receive an operation for activating the information processing apparatus in the first activation mode from a user, a notification unit configured to notify the control unit of information corresponding to the operation of the user received by the receiving unit, and a connection unit configured to connect the control unit and the receiving unit without connecting the notification unit and to notify the control unit that a user has operated on the receiving unit, wherein the control unit activates, in the case where it is not notified via the connection unit that a user has operated on the receiving unit, the information processing apparatus in the second activation mode without waiting for activation of the notification unit.

Further features of the present invention will become apparent from the following description of exemplary embodiments with reference to the attached drawings.

BRIEF DESCRIPTION OF THE DRAWINGS

FIG. 1 illustrates a configuration of a system to which an image forming apparatus is applied to.

FIGS. 2A and 2B illustrate activation methods of the image forming apparatus.

FIG. 3 is a flowchart illustrating a control method of the image forming apparatus.

FIG. 6 illustrates a configuration of the system to which a conventional image forming apparatus is applied to.

DESCRIPTION OF THE EMBODIMENTS

Various exemplary embodiments, features, and aspects of the invention will be described in detail below with reference to the drawings. The exemplary embodiments to be described below are not limitations to a scope of claims of the present invention. Further, not all of combinations of features described in the exemplary embodiments are necessary for realizing solutions according to the present invention.

<System Configuration>

Figure 1:
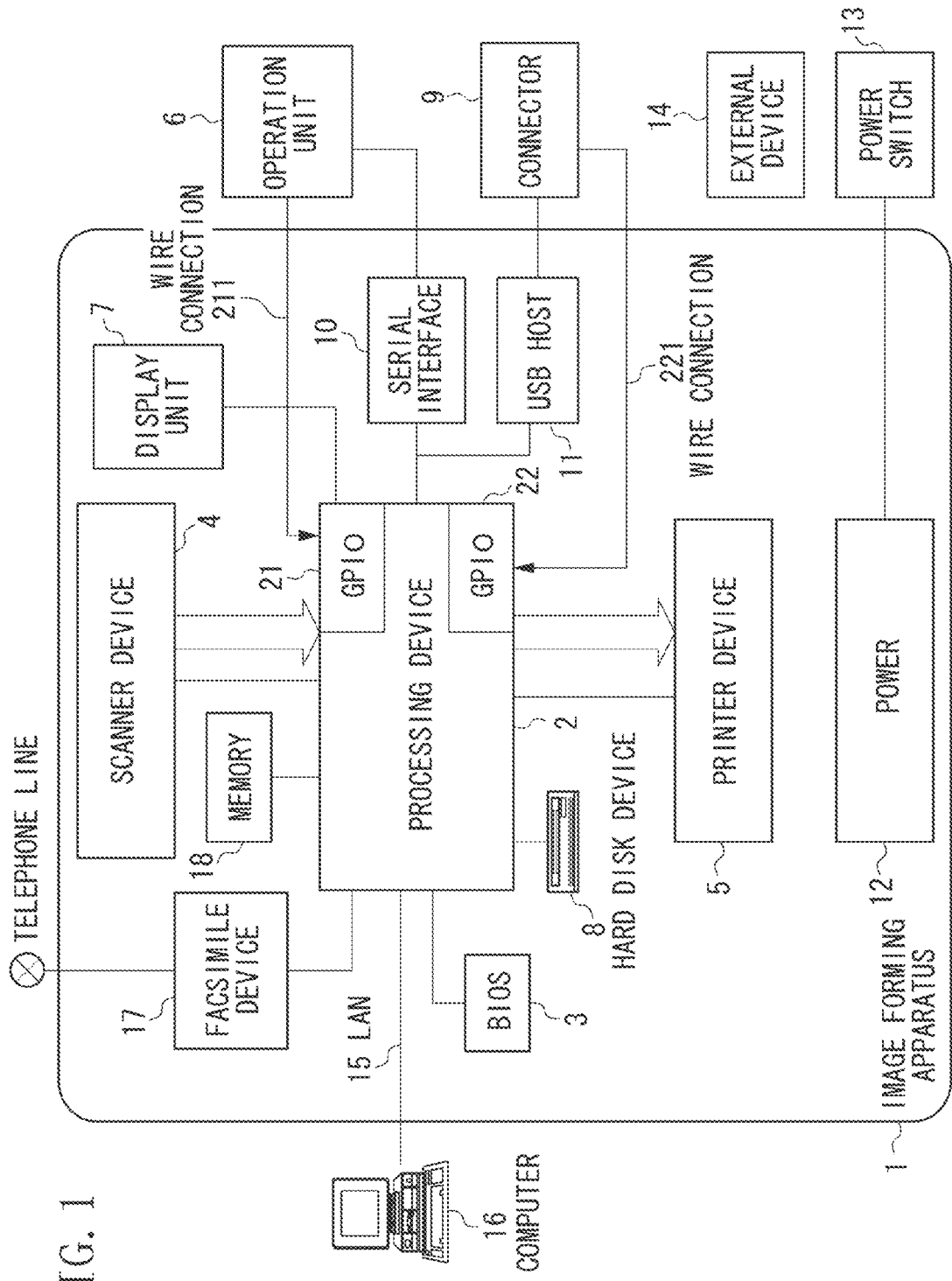
Figure 6:
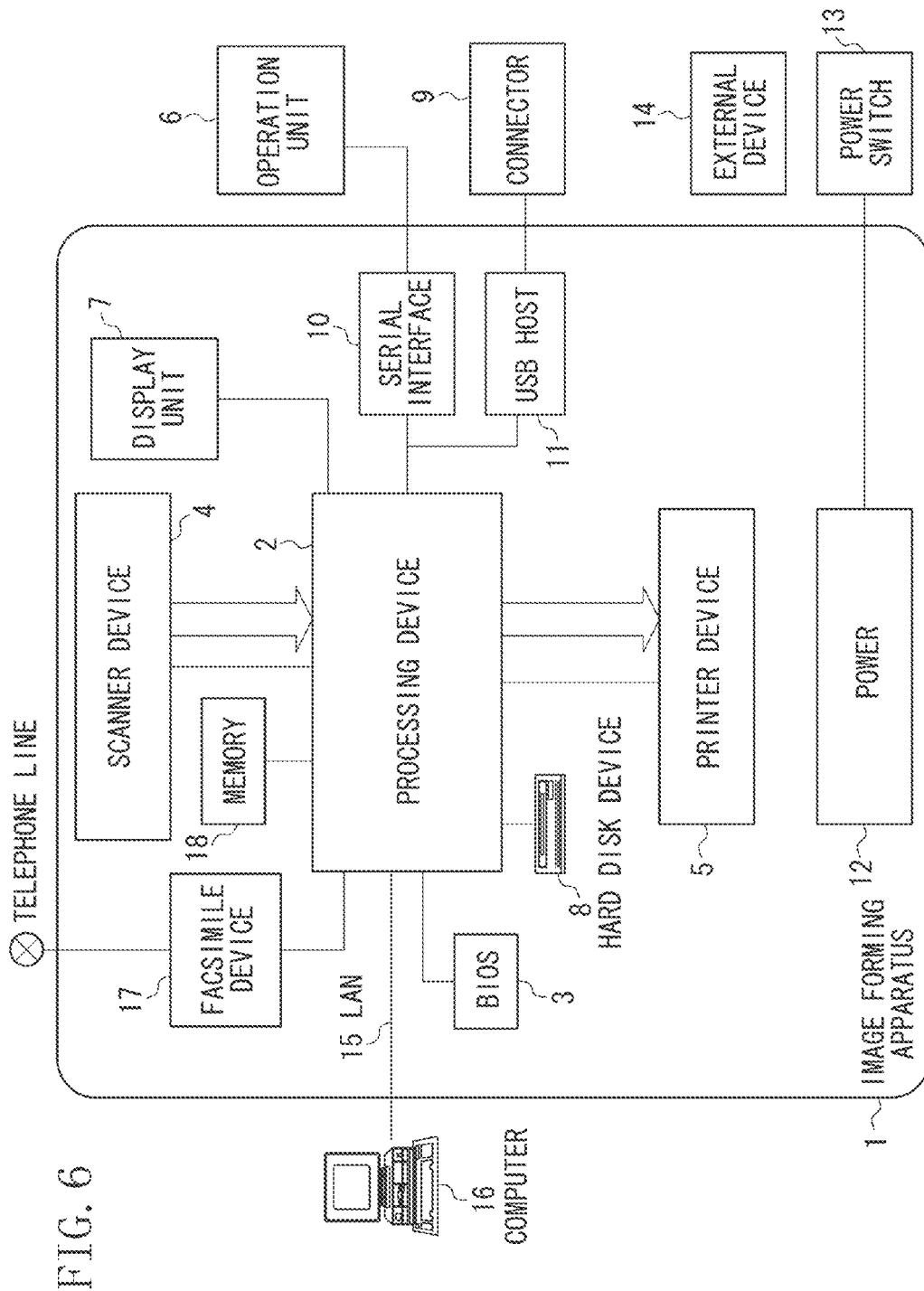

FIG. 1 illustrates an example of a system which an image forming apparatus according to a first exemplary embodiment is applied to. According to the present exemplary embodiment, an external computer 16 and an image forming apparatus 1 communicate with each other. Further, the image forming apparatus 1 is connected to a telephone line and performs facsimile communication. FIG. 6 illustrates a configuration of a system including a conventional image forming apparatus, and differences between the systems illustrated in FIG. 1 and FIG. 6 will be described below.

Referring to FIG. 1, a processing device 2 performs control by loading in a memory 18 and executing a program stored in a read-only memory (ROM) or a hard disk device 8 to be described below. Further, the processing device 2 initializes a device to be described below based on a basic input output system (BIOS) 3 which stores an initialization program.

A scanner device 4 optically reads an image from a document and converts the read image to a digital image. A printer device 5 outputs the digital image on a paper device. An operation unit 6 is used for an operation of the image forming apparatus 1. A display unit 7 displays information on the image forming apparatus 1. The hard disk device 8 stores a program for executing functional processing to be described below and a control program for performing digital image processing.

A connector 9 connects to the external devices including a USB device. A serial interface (a universal asynchronous receiver-transmitter (UART)) 10 monitors the operation unit 6. A USB host 11 monitors and controls the connector 9. A power source 12 supplies necessary power to each device in the image forming apparatus 1. A power switch 13 is used for supplying and shutting the power. An external device 14 is an optional device. A local area network (LAN) 15 communicates with the computer 16 using a predetermined protocol. A facsimile device 17 transmits a digital image to the telephone line. A memory 18 temporarily stores programs to be executed by the processing device 2 and data.

If a user switches on the power switch 13, the image forming apparatus 1 is activated. Upon activation of the system, the processing device 2 is capable of directly detecting via a general purpose input/output (GPIO) 21 that the user has pressed a specific key in the operation unit 6 corresponding to the external interface. The processing device 2 is similarly capable of directly detecting whether a device such as the USB device is connected to the connector 9 corresponding to the external interface (i.e., the USB interface). Further, the processing device 2 is capable of determining a connection status of the external interface connected to the internal interface by performing polling as will be described below.

According to the present exemplary embodiment, the serial interface 10 and the USB host 11 correspond to the internal interface, and the operation unit 6 and the connector 9 correspond to the external interface.

The image forming apparatus 1 is capable of executing various jobs. Examples of the jobs will be described below.

<Copy Function>

A copy function is for recording an image read by the scanner device 4 on the hard disk device 8 and performing printing using the printer device 5 at the same time.

<Image Transmission Function>

An image transmission function is for transmitting the image read by the scanner device 4 to the computer 16 via the LAN 15.

<Image Storage Function>

An image storage function is for recording the image read by the scanner device 4 on the hard disk device 8, and transmitting and printing the image as necessary.

<Image Print Function>

An image print function is for analyzing a page description language transmitted from the computer 16 and printing the result on the printer device 5.

The difference between the activation processes of the conventional system (i.e., a first activation method) and the present exemplary embodiment will be described below with reference to FIG. 1. In the activation process of the conventional system, a central processing unit (CPU) (not illustrated) in the processing device 2 loads the information on the BIOS 3 after the system is switched on, and performs activation processing such as recognition of storage and the interface. Since the image forming apparatus has a plurality of activation modes, it is necessary to load different programs according to whether the user has performed the special operation to activate the system.

<The First Activation Method>

The user operates on the power switch 13 to supply power from the power source 12. The processing device 2 is then activated, loads an activation program in the BIOS 3, and initializes the serial interface 10 and the USB host 11, i.e., the internal interfaces. Further, the processing device 2 performs polling on the operation unit 6 and the connector 9, i.e., the external interfaces, via the serial interface 10 and the USB host 11, i.e., the internal interfaces.

The processing device 2 continues to inquire the serial interface 10 and the USB host 11 for a predetermined period of time. If the user then performs the special operation on the operation unit 6, the CPU (not illustrated) in the processing device 2 loads a service mode program from the hard disk device 8 to the memory 18 and activates the apparatus. If the processing device 2 determines that the special operation has not been detected, the processing apparatus 2 loads a normal user mode program and activates the apparatus.

Further, if the user connects the external device 14 to the connector 9, the processing device 2 initializes the external device 14 during activation. If the processing device 2 determines that no external device is connected, the processing device 2 does not perform initialization.

<Second Activation Method>

A second activation method of the image forming apparatus according to the present exemplary embodiment will be described below.

According to the present exemplary embodiment, an example for the configuration in which both the first activation method and the second activation method are performed will be described below. The actual system is not limited to the solutions to be described below.

According to the present exemplary embodiment, wire connections 211 and 221, and GPIO 21 and 22 are additionally included as illustrated in FIG. 1 as compared to the conventional system configuration.

The wire connection 211 connects the operation unit 6 to the GPIO 21 in the processing device 2, and the wire connection 221 connects the connector 9 to the GPIO 22 in the processing device 2. If the user operates on the operation unit 6 (e.g., presses the button), the GPIO 21 is asserted. Similarly, if the external device 14 is connected to the connector 9, the GPIO 22 is asserted.

Further, according to the present exemplary embodiment, a program which executes processes to be described below is added to the programs in the BIOS 3.

More specifically, if the GPIO 21 is asserted when the power is supplied and the system is activated, the processing device 2 determines that the user is performing an operation on the operation unit 6. In such a case, the processing device 2 performs initialization according to the first activation method. On the other hand, if the user is not performing an operation on the operation unit 6, the processing device 2 determines that there is no user operation. In such a case, the processing device 2 performs the second activation method and skips initialization of the serial interface 10 illustrated in FIG. 1.

Similarly, if the GPIO 22 is asserted, the processing device 2 is capable of determining that a device has been connected to the connector 9. The processing device 2 thus performs initialization according to the first activation method.

On the other hand, if the processing device 2 determines that the GPIO 22 has not been asserted, there is no user device so that it is not necessary to detect the user device when the apparatus is activated. As a result, the processing device 2 performs the second activation method with respect to the USB host 11. In such a case, the processing device 2 skips the initialization of the USB host 11. The system according to the present exemplary embodiment illustrated in FIG. 1 is different from the conventional system illustrated in FIG. 6 in that the system includes the GPIO 21 and 22.

FIGS. 2A and 2B illustrate activation methods performed in the image forming apparatus according to the present exemplary embodiment. More specifically, FIG. 2A illustrates the case where the GPIO 21 is asserted when the user has operated on the operation unit 6 illustrated in FIG. 1. Further, FIG. 2B illustrates the case where the GPIO 22 is asserted when a device is connected to the connector 9. Both cases will be described below. The configurations in which the GPIO 21 and 22 are asserted are not limited to circuits illustrated in FIGS. 2A and 2B. The processing device 2 is capable of determining whether the external device is in a specific status from status signals of the GPIO 21 and 22 without using the internal interface.

An example of the configuration will be described below. The actual system is not limited to the following solution.

After the power has been supplied, the operation unit 6 and the connector 9 are energized. Both the operation unit 6 and the connector 9 include an automatic reset type switch, and when the user presses a button (or connects a device), the switch is set on. In the case of the operation unit 6, there is a switch for each button connected to the GPIO 21 via a logical OR 23, so that pressing of all buttons 0, 1, 2, 3, 4, 5, 6, 7, 8, and 9 is detected. The number of buttons is increased or decreased according to the specifications of the image forming apparatus.

According to the present exemplary embodiment, the above-described configuration is employed. As a result, the operation on the serial interface 10 or the connection of the device to the USB host 11 by the user is detectable, even if the serial interface 10 and the USB host 11 are not initialized in an initialization process to be described below.

FIG. 3 is a flowchart illustrating a control method of the image forming apparatus according to the present exemplary embodiment. A process illustrated in FIG. 3 is an example of an activation branching process including the serial interface 10 and the USB device. Each step is realized by a CPU (not illustrated) in the processing device 2 illustrated in FIG. 1 executing a control program. The present example illustrates the process for activating the image forming apparatus according to whether the GPIO 21 and the GPIO 22 are asserted based on whether there has been a user operation or whether a device has been connected as described above with reference to FIGS. 2A and 2B.

In step S301, the processing device 2 confirms a potential of the GPIO 21 immediately after the system starts to activate, and determines whether the key in the operation unit 6 has been pressed. If the processing device 2 determines that the GPIO 21 has been asserted, the processing device 2 detects that the key in the operation unit 6 has been pressed (YES in step S301). The process then proceeds to step S302. In step S302, the processing device 2 activates the serial interface 10 (i.e., a user interface (UI) I/F) employing the first activation method. The details of an activation sequence will be described below with reference to FIG. 4A. The key determined to be pressed is the key for requesting the service mode assigned to the plurality of keys included in the operation unit 6.

On the other hand, if the processing device 2 determines that the GPIO 21 is not asserted (NO in step S301), the process proceeds to step S303. In step S303, the processing device 2 activates the system employing the second activation method in which the initialization of the serial interface 10 (i.e., UI I/F) is skipped. The details of the activation sequence will be described below with reference to FIG. 4B.

In step S304, the processing device 2 checks potential of the GPIO 22 and determines whether the USB device corresponding to the user device is connected. If the processing device 2 determines that the GPIO 22 is asserted, the processing device 2 can determine that a USB device is connected to the connector 9 (YES in step S304). In such a case, the process proceeds to step S305. In step S305, the processing device 2 activates the USB I/F employing the first activation method. The details of the activation sequence will be described below with reference to FIG. 5A.

If the processing device 2 determines that the GPIO 22 is not asserted (NO in step S304), the process proceeds to step S306. In step S306, the processing device 2 activates the system employing the second activation method in which the initialization of the USB I/F is skipped. The details of the activation sequence will be described below with reference to FIG. 5B.

Figure 4A:
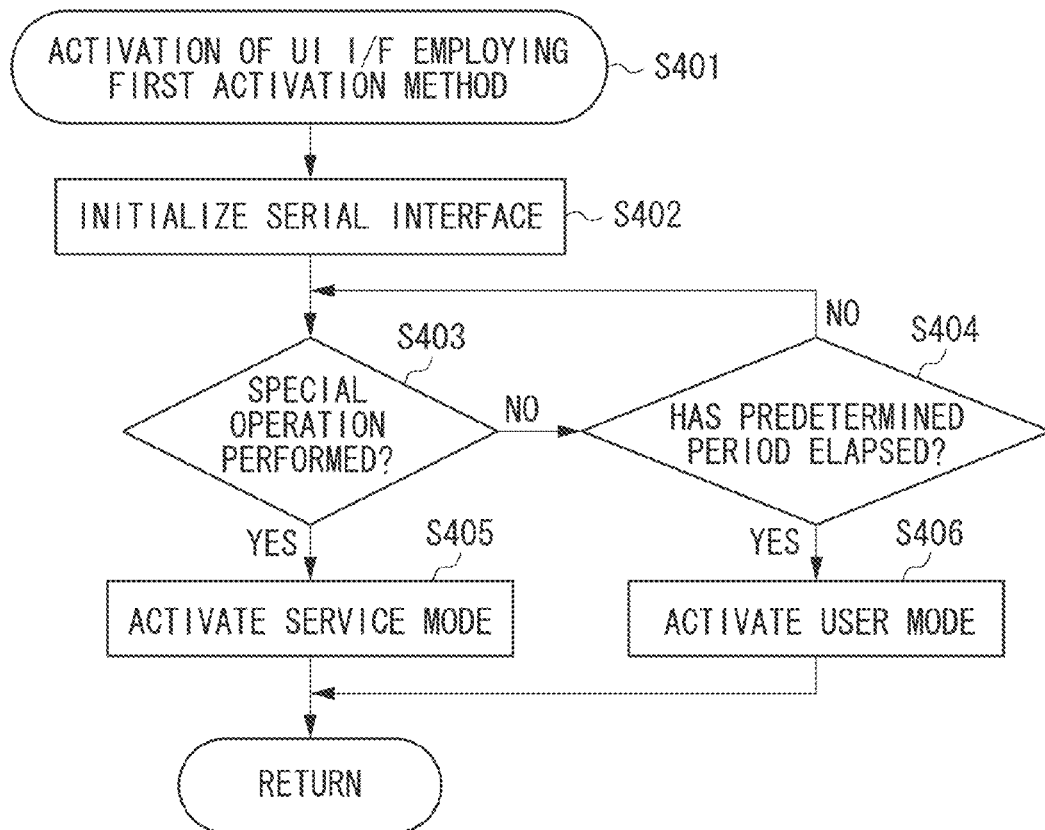
FIGS. 4A and 4B are flowcharts illustrating the control methods of the image forming apparatus.
Figure 4B:
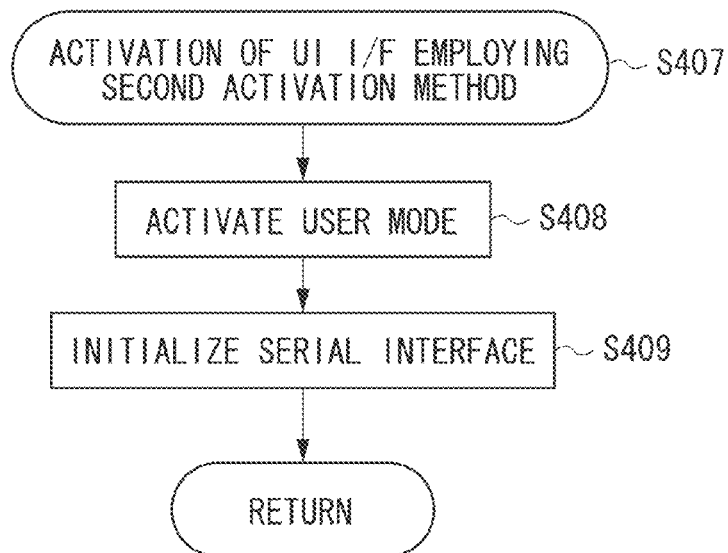

FIGS. 4A and 4B are flowcharts illustrating control methods of the image forming apparatus according to the present exemplary embodiment. The examples of FIGS. 4A and 4B are flowcharts illustrating the activation branching process with respect to the initialization of the serial interface. The initialization of the serial interface based on the first activation method will be described below with reference to FIG. 4A. Further, the initialization of the serial interface based on the second activation method will be described below with reference to FIG. 4B.

<Initialization of the Serial Interface Based on the First Activation Method>

Referring to FIG. 4A, in step S402, the processing device 2 initializes the serial interface. In step S403, the processing device 2 determines whether the user has performed the special operation on the operation unit 6. More specifically, the processing device 2 performs polling on the operation unit 6 connected to the serial interface.

If the processing device 2 determines that there is no special operation (NO in step S403), the process proceeds to step S404. In step S404, the processing device 2 continues to perform polling for a predetermined period of time. If the processing device 2 has detected the special operation within a predetermined period of time (YES in step S403), the process proceeds to step S405. In step S405, the processing device 2 activates the system in the service mode. The process then ends.

If the processing device 2 determines that the predetermined period of time has elapsed and that the special operation cannot be detected within the predetermined period of time (YES in step S404), the process proceeds to step S406. In step S406, the processing device 2 activates the system in the user mode. The process then ends.

<Initialization of the Serial Interface Based on the Second Activation Method>

If the processing device 2 determines that there is no user operation on the keys in step S301 of the flowchart illustrated in FIG. 3, a process of step S407 illustrated in FIG. 4B starts. In step S408, the processing device 2 activates the system in the user mode. In step S409, the processing device 2 initializes the serial interface. The process then ends.

As a result, the timing of initializing the serial interface can be adjusted to the timing as illustrated in FIG. 4B instead of the timing as illustrated in FIG. 4A. The initialization of the serial interface can thus be postponed as compared to the first activation method. The user can thus actually feel that the activation time has shortened.

As described above, if the processing device 2 has not detected that the operation unit 6, i.e., the external interface, is not in a predetermined status based on the status of the GPIO 21, control can be performed to initialize the serial interface 10, i.e., the internal interface, employing the second activation method which is different from the first activation method.

Figure 5A:
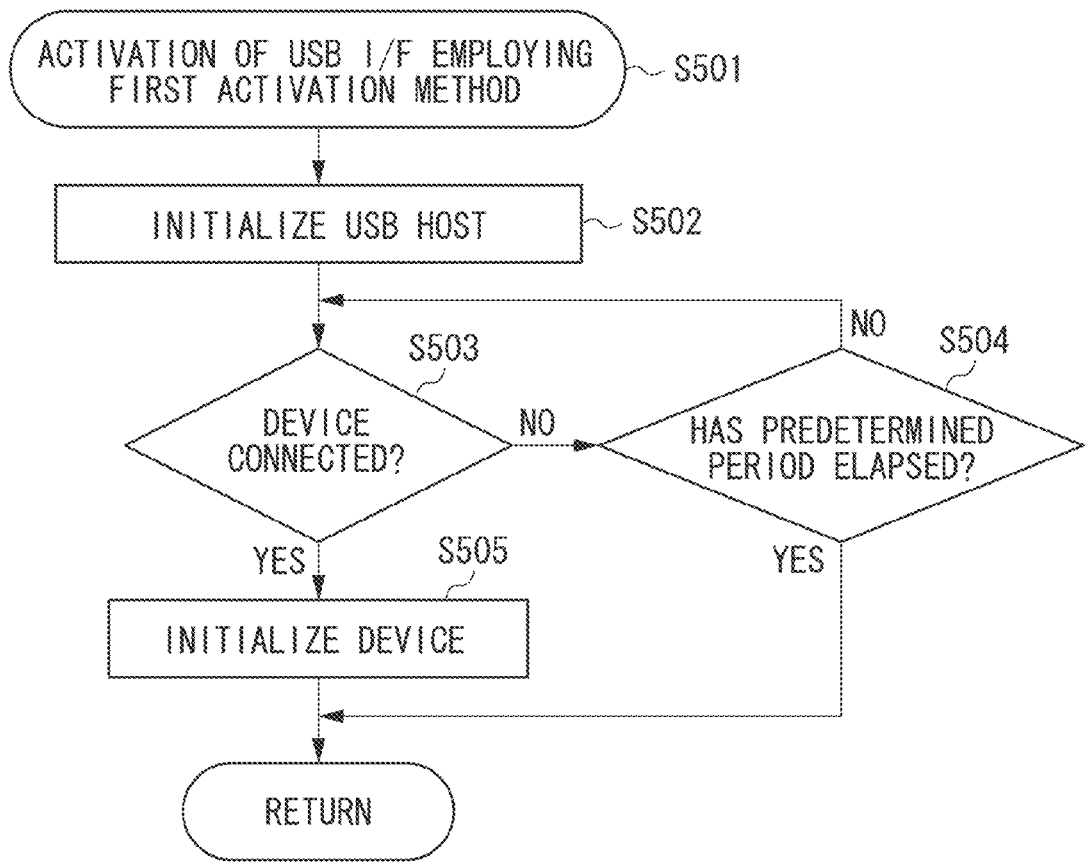
FIGS. 5A and 5B are flowcharts illustrating the control methods of the image forming apparatus.
Figure 5B:
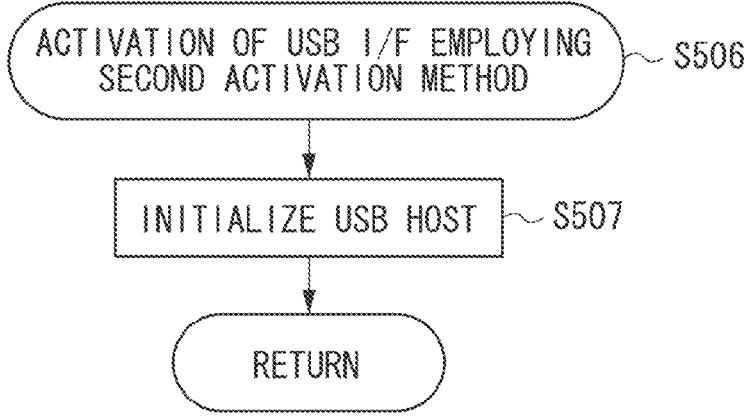

FIGS. 5A and 5B are flowcharts illustrating control methods of the image forming apparatus according to the present exemplary embodiment. The examples of FIGS. 5A and 5B are flowcharts illustrating the activation branching process with respect to the initialization of the USB I/F. The initialization of the USB I/F based on the first activation method will be described below with reference to FIG. 5A. Further, the initialization of the USB I/F based on the second activation method will be described below with reference to FIG. 5B.

<Initialization of the USB Host Based on the First Activation Method>

Referring to FIG. 5A, in step S502, the processing device 2 initializes the USB host in the case of the first activation method. In step S503, the processing device 2 determines whether a device has been connected to the connector 9. More specifically, the processing device 2 performs polling on the connector connected to the USB host.

If the processing device 2 determines that the device is not connected to the connector 9 (NO in step S503), the process proceeds to step S504. In step S504, the processing device 2 continues to perform polling for a predetermined period of time. If the processing device 2 has detected that the device is connected within a predetermined period of time (YES in step S503), the process proceeds to step S505. In step S505, the processing device 2 initializes the device.

If the processing device 2 determines that connection of the device cannot be detected within the predetermined period of time (YES in step S504), the process ends without performing any processing.

<Initialization of the USB Host Based on the Second Activation Method>

If the processing device 2 determines that the USB device is not connected to the connector 9 in step S304 of the flowchart illustrated in FIG. 3, the process proceeds to step S306, and to step S506 of the flowchart illustrated in FIG. 5B. In step S506 and step S507, the processing device 2 then starts the process for activating the USB host 11 employing the second activation method.

As a result, when the processing device 2 determines that the USB device is not connected to the connector 9 of the USB host 11, the initialization timing of the USB host 11 can be adjusted. The user can thus actually feel that the activation time has shortened.

Each of the steps according to the present invention may also be realized by a processing device (e.g., the CPU or a processor) in the PC (i.e., a computer) executing software obtained via a network or various storage media.

The present invention is not limited to the above-described exemplary embodiment, and various modifications (including organized combinations of the exemplary embodiments) may be realized based on the present invention and are not excluded from the scope of the present invention.

According to the present exemplary embodiment, the initialization timing of the internal interface can be adjusted by detecting the status of the external interface connected to the internal interface.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-271408 filed Dec. 27, 2013, which is hereby incorporated by reference herein in its entirety.

What is claimed is:

1. An information processing apparatus comprising:
a power control device that receives an instruction to turn on the information processing apparatus;
a processor that performs activation processes of the information processing apparatus in a case where the power control device receives the instruction to turn on the information processing apparatus;
an operation device that receives operations by a user; and
an interface device that transmits, to the processor, information indicating whether the operation device received a predetermined operation,
wherein the processor:
receives, not via the interface device, a signal indicating that the operating device receives an operation;
performs first activation processes, based on that the power control device has received the instruction to turn on the information processing apparatus and the processor has received the signal; and
performs second activation processes, based on that the power control device has received the instruction to turn on the information processing apparatus and the processor has not received the signal, wherein, in the first activation processes, the processor initializes the interface device and activates, based on the information transmitted from the initialized interface device, the information processing apparatus in a first mode or a second mode, and wherein, in the second activation processes, the processor activates the information processing apparatus in the first mode without waiting for a transmission of the information from initialized interface device.

2. The information processing apparatus according to claim 1, wherein, in the second activation processes, the processor activates the information processing apparatus in the first mode without waiting for an initialization of the interface device.

3. The information processing apparatus according to claim 1, wherein, in the first activation processes, the processor activates the information processing apparatus in the first mode based on that the information transmitted from the initialized interface device indicates that the operation device has not received the predetermined operation, and activates the information processing apparatus in the second mode based on that the information transmitted from the initialized interface device indicates that the operation device has received the predetermined operation.

4. The information processing apparatus according to claim 1, further comprising a printer.

5. An information processing apparatus comprising:
a power control device that receives an instruction to turn on the information processing apparatus;
a processor that performs activation processes of the information processing apparatus in a case where the power control device receives the instruction to turn on the information processing apparatus;
a connector that connects an external apparatus to the information processing apparatus; and
an interface device that is between the connector and the processor,
wherein the processor:
receives, not via the interface device, a signal indicating that the external device is connected to the connector;
performs first activation processes, based on that the power control device has received the instruction to turn on the information processing apparatus and the processor has received the signal; and
performs second activation processes, based on that the power control device has received the instruction to turn on the information processing apparatus and the processor has not received the signal,
wherein, in the first activation processes, the processor initializes the interface device and initializes the external device using the initialized interface device before a predetermined activation process is performed, and wherein, in the second activation processes, the processor initializes the interface device after the predetermined activation process is performed.

6. The information processing apparatus according to claim 5, further comprising a printer.

7. A control method for an information processing apparatus, the method comprising:
receiving, by a power control device, an instruction to turn on the information processing apparatus;
starting, by a processor, activation processes of the information processing apparatus in a case where the power control device receives the instruction to turn on the information processing apparatus;
receiving, by an operation device, operations by a user;
receiving, by the processor, not via an interface device, a signal indicating that the operating device receives an operation;
initializing, by the processor, an interface device;
transmitting, by the initialized interface device, to the processor, information indicating whether the operation device received a predetermined operation; and
activating, by the processor, the information processing apparatus in a first mode or a second mode based on the information transmitted from the initialized interface device, based on that the power control device has received the instruction to turn on the information processing apparatus and the processor has received the signal,
wherein the information processing apparatus is activated in the first mode by the processor without waiting for a transmission of the information from initialized interface device, based on that the power control device has received the instruction to turn on the information processing apparatus and the processor has not received the signal.

8. A control method for an information processing apparatus, the method comprising:
receiving, by a power control device, an instruction to turn on the information processing apparatus;
starting, by a processor, activation processes of the information processing apparatus in a case where the power control device receives the instruction to turn on the information processing apparatus;
receiving, not via an interface device that is between a connector and the processor, a signal indicating that an external device is connected to the connector; and
performing, by the processor, initialization of the interface device and initialization of the external device using the initialized interface device before a predetermined activation process is preformed, based on that the power control device has received the instruction to turn on the information processing apparatus and the processor has received the signal,
wherein, the processor initializes the interface device after the predetermined activation process is performed, based on that the power control device has received the instruction to turn on the information processing apparatus and the processor has not received the signal.

* * * * *